United States Patent
Türetken et al.

(10) Patent No.: US 8,194,184 B2
(45) Date of Patent: Jun. 5, 2012

(54) METHOD AND APPARATUS FOR INCREASING THE FRAME RATE OF A VIDEO SIGNAL

(75) Inventors: Engin Türetken, Ankara (TR); Abdullah Aydin Alatan, Ankara (TR)

(73) Assignee: Vestel Elektronik Sanayi Ve Ticaret A.S., Manisa (TR)

( * ) Notice: Subject to any disclaimer, the term of this patent is extended or adjusted under 35 U.S.C. 154(b) by 403 days.

(21) Appl. No.: 12/545,385

(22) Filed: Aug. 21, 2009

(65) Prior Publication Data

US 2010/0079667 A1    Apr. 1, 2010

Related U.S. Application Data

(60) Provisional application No. 61/090,776, filed on Aug. 21, 2008.

(51) Int. Cl.
    H04N 7/01    (2006.01)
(52) U.S. Cl. ........................................ 348/441
(58) Field of Classification Search .............. 348/443,
    348/445, 441, 448, 699–701; 375/240.1,
    375/240.16, 240.18
    See application file for complete search history.

(56) References Cited

U.S. PATENT DOCUMENTS

| | | | |
|---|---|---|---|
| 5,557,684 A | | 9/1996 | Wang et al. |
| 5,598,215 A | * | 1/1997 | Watanabe .................. 348/416.1 |
| 5,784,115 A | * | 7/1998 | Bozdagi ......................... 348/452 |
| 5,966,178 A | * | 10/1999 | Tashima et al. ........... 375/240.18 |
| 6,157,677 A | * | 12/2000 | Martens et al. ........... 375/240.16 |
| 6,229,570 B1 | * | 5/2001 | Bugwadia et al. ............. 348/441 |
| 6,594,403 B1 | * | 7/2003 | Bozdagi et al. ................ 382/284 |
| 6,597,816 B1 | * | 7/2003 | Altunbasak et al. ........... 382/275 |
| 6,665,423 B1 | * | 12/2003 | Mehrotra et al. .............. 382/107 |
| 7,224,731 B2 | * | 5/2007 | Mehrotra .................. 375/240.16 |
| 7,599,512 B2 | * | 10/2009 | Shimizu et al. ............... 382/100 |
| 7,710,498 B2 | * | 5/2010 | Kondo et al. .................. 348/441 |
| 2004/0252759 A1 | | 12/2004 | Winder et al. | |
| 2006/0222077 A1 | | 10/2006 | Ohwaki et al. | |

(Continued)

FOREIGN PATENT DOCUMENTS

| | | |
|---|---|---|
| JP | 2003/109677 A | 5/1991 |
| WO | 2007/038697 A2 | 4/2007 |
| WO | 2007/123759 A1 | 11/2007 |
| WO | 2008/002491 A2 | 1/2008 |

OTHER PUBLICATIONS

European Search Report and Written Opinion dated Mar. 23, 2009 issued in corresponding Application No. 09150341.7, 9 pages.

(Continued)

*Primary Examiner* — Paulos Natnael
(74) *Attorney, Agent, or Firm* — Conley Rose, P.C.

(57) ABSTRACT

A method and an apparatus are disclosed for increasing the frame rate of an input video signal by interpolating video frames between original video frames of the input video signal and inserting interpolated video frames between original video frames of the input video signal to produce an output video signal having a higher frame rate than the input signal.

17 Claims, 5 Drawing Sheets

U.S. PATENT DOCUMENTS

| | | |
|---|---|---|
| 2007/0071100 A1 | 3/2007 | Shi et al. |
| 2007/0140346 A1 | 6/2007 | Chen et al. |
| 2007/0297513 A1* | 12/2007 | Biswas et al. ............ 375/240.16 |
| 2008/0031338 A1 | 2/2008 | Sato et al. |
| 2008/0069221 A1 | 3/2008 | Ohwaki et al. |
| 2010/0079667 A1* | 4/2010 | Turetken et al. .............. 348/443 |

OTHER PUBLICATIONS

English Abstract of JP 03/109677 dated May 9, 1991, 1 page.

Hartley, R. et al., "Estimation—2D Projective Transformations," Multiple View Geometry in Computer Vision, Cambridge University Press, GB, pp. 87-131, Jan. 1, 2003.

Shi, J. et al., "Good features to track", in Proc. IEEE International Conf. Computer Vision and Pattern Recognition (CVPR). IEEE Press, 1994 (8 pages).

Malis, E. et al., "Deeper understanding of the homography decomposition for vision-based control", Institut National de Recherche en infonnatique et en Automatique, ISSN 0249-6399 ISRN INRIA/RR-6303-FR+ENG, 2007 (93 pages).

* cited by examiner

METHOD AND APPARATUS FOR INCREASING THE FRAME RATE OF A VIDEO SIGNAL

This application claims the benefit of priority to U.S. application Ser. No. 61/090,776, filed Aug. 21, 2008, the content of which is hereby incorporated by reference in its entirety for all purposes.

FIELD OF INVENTION

The invention relates to a method of and apparatus for increasing the frame rate of a video signal.

BACKGROUND

Frame rate up-conversion (FRUC), or scan/field rate up-conversion, may be considered as a technique of increasing the frame rate of a video signal by inserting one or more interpolated frames between successive frames of the original signal. FRUC has a number of applications. For example, FRUC may be utilized to up-convert the frame rate of a typical broadcast signal for hold-type displays. Hold-type displays, such as liquid crystal displays (LCD) and electro-luminescence displays (ELD), are known to have the characteristic of holding the displayed frame of a video signal until the next frame is written. This property causes moving objects to appear blurred because the eyes predict the next frame in a time interval that is shorter than the inter-frame display period of an original sequence and try to track the moving object. Therefore, for a better perceived image quality, FRUC is required to up-convert a low frequency video signal (which is typically 25 frames per second (fps) for PAL or SECAM and (nominally) 30 fps for NTSC systems) to a higher frequency signal (such as 50, 60, 100 OR 120 fps). As another example, FRUC can be used to convert video signals in PAL or SECAM formats (at 25 fps) to NTSC format (at 30 fps). As yet another example, FRUC can be used to convert motion picture ("film" or "movie") signals (at 24 fps) to a higher frame rate (such as for PAL or SECAM or NTSC formats, or to the higher frame rates just mentioned).

Two FRUC techniques are commonly used: frame duplication/repetition and motion compensation based schemes.

Frame duplication/repetition based techniques simply insert a copy of one of a pair of frames between the two frames. This requires little computational power but generally yields relatively poor results, especially in complex scenes, where for example a camera capturing the scene, which may have a high depth variation, undergoes motion or there are moving objects in the scene. On the other hand, motion compensation based approaches yield more satisfactory results in many complex situations, though with the cost of a higher computational and implementation complexity.

As an initial step, most of the known motion compensation based techniques estimate motion vectors between the successive frames of an original video sequence by utilizing a search mechanism or using spatio-temporal image gradients. Typically, those motion vectors are then interpolated to locate corresponding positions in the "virtual" frame that is to be interpolated and inserted between the successive frames of the original video sequence. Many of these techniques, such as those disclosed in WO-A-2007/123759, US-A-2008/0069221, US-A-2008/0031338, US-A-2007/0140346 and US-A-2006/0222077, rely on the idea of linearly or symmetrically interpolating the motion vectors between the original successive frames to estimate the motion vectors representing the motion between the interpolated frame and the original frames. As an example, in specific embodiments of these methods, a motion vector from the first frame to the second frame (which are separated in time) of an original video sequence is found. Then a simple assumption is made that a motion vector that represents the motion from an interpolated frame that is halfway between the first and second frames of the original sequence to the second frame of the original sequence has half the magnitude and the same direction as the motion vector from the first frame to the second frame of the original sequence. However, this approach has limitations. For example, it does not take into account the true 3D camera motion and therefore may yield erroneous results in the case of a large camera-induced 2D image motion.

As an alternative to the scheme of linear interpolation of the motion vectors between a pair of successive frames, the parameters of a parametric model describing the in-between motion may be estimated and interpolated. For example, U.S. Pat. No. 6,229,570 discloses a method that describes the motion field between original frames of an input video signal by an affine transformation. In this method, a polynomial function is then found to represent the displacements of pixels between frames in the original sequence, and that polynomial function is then interpolated to find the locations of pixels in the interpolated frame. Moreover, in this method, the affine model is used for representing two dimensional motion only and affine model parameters are not interpolated for describing the motion between the virtual frame and the original frames. In yet other examples, U.S. Pat. No. 5,966,178 and JP-A-03/109677 disclose two methods for estimating and interpolating 4-parameter and 6-parameter affine models respectively. However, in these prior art methods, first, the outline of a possibly moving object is detected, it being implicitly assumed that background region is stationary (i.e. it is assumed that there is no camera motion). The parameters of the affine transformation are then calculated only for the regions that are determined to include moving objects. Another limitation of these prior art methods is their relatively simplistic interpolation of the scale factors for the affine parameters. For example, linear interpolation of some scale parameters is used, but this approach fails to produce satisfactory results, particularly in the case of zooming and relative object-camera motion in the camera principle axis direction. This is despite the fact that affine transformation models zoom quite well.

According to a first aspect of an embodiment of the invention, there is provided a method of increasing the frame rate of an input video signal by interpolating video frames between original video frames of the input video signal and inserting interpolated video frames between original video frames of the input video signal to produce an output video signal having a higher frame rate than the input signal, the method comprising:

for each of plural regions in a first frame of an input video signal and plural corresponding regions of a second frame of the input video signal:

(A) estimating six affine parameters of an affine model that represent relative motion between a region in a first frame of an input video signal and a corresponding region in a second frame of the input video signal;

(B) decomposing said six affine parameters into six 2-dimensional motion parameters;

(C) interpolating the six 2-dimensional motion parameters for a time instant between the first and second frames to obtain interpolated 2-dimensional motion parameters that represent motion from a region in an interpolated frame to at least one of (i) said region in the first frame and (ii) said region in the second frame, wherein the interpolated frame is to be inserted between the first and second frames and wherein said region in the interpolated frame corresponds to said regions in the first and second frames;

(D) obtaining, from said interpolated 2-dimensional motion parameters, six affine parameters that represent (i) motion from said region in the interpolated frame to said region in the first frame in the case that said interpolated 2-dimensional motion parameters represent motion from the region in the interpolated frame to said region in the first frame and/or (ii) motion from said region in the interpolated frame to said region in the second frame in the case that said interpolated 2-dimensional motion parameters represent motion from the region in the interpolated frame to said region in the second frame; and, (E) locating a position in (i) the first frame in the case that said interpolated 2-dimensional motion parameters represent motion from the region in the interpolated frame to said region in the first frame, and/or (ii) the second frame in the case that said interpolated 2-dimensional motion parameters represent motion from the region in the interpolated frame to said region in the second frame, said position corresponding to a pixel in said region of the interpolated frame and being located by using the respective six affine parameters obtained in step (D), and obtaining an intensity of said pixel in said region of the interpolated frame as a function of the intensities at said position(s); and, having by (E) interpolated plural regions of the interpolated frame such that the whole of the interpolated frame has been obtained, inserting said interpolated frame between said first and second frames.

This aspect uses the affine transformation to map points between the original frames of the video sequence and to locate sub-pixel accurate positions of pixels in one or both of the original frames that correspond to positions of pixels in the virtual frame. The decomposition of the six affine parameters into the six 2-dimensional motion parameters and the subsequent interpolation of those six 2-dimensional motion parameters for the virtual frame are important steps in this aspect for achieving natural and realistic interpolation of frames between original frames of a video sequence.

The second frame may be subsequent to the first frame and the parameter interpolation carried out in a forward direction. Alternatively, and/or additionally the parameter interpolation may be backwards, or may be both backwards and forwards.

In an embodiment, the method:

(C) comprises interpolating the six 2-dimensional motion parameters for a time instant between the first and second frames to obtain interpolated 2-dimensional motion parameters that represent motion from a region in an interpolated frame to said region in the first frame;

(D) comprises obtaining from said interpolated 2-dimensional motion parameters a first set of six affine parameters that represent motion from said region in the interpolated frame to said region in the first frame, and obtaining a second set of six affine parameters that represent motion from said region in the interpolated frame to said region in the second frame from said first set of six affine parameters that represent motion from said region in the interpolated frame to said region in the first frame and said six affine parameters that represent relative motion between said region in the first frame and said corresponding region in said second frame; and, (E) comprises obtaining the interpolated region of the interpolated frame by: locating the sub-pixel position in the first frame that corresponds to a pixel in said region of the interpolated frame by using said first set of six affine parameters obtained in step (D), locating the sub-pixel position in the second frame that corresponds to a pixel in said region of the interpolated frame by using said second set of six affine parameters obtained in step (D), and obtaining an interpolated intensity of said pixel in said region of the interpolated frame as a function of the intensities at said positions in the first and second frames.

This embodiment "looks" from the pixels in the interpolated frame to the pixels in both the "backward" frame (for example, the first frame) and the "forward" frame (for example, the second frame) for intensity, which tends inevitably to produce better looking results for the interpolated frame. This is achieved without encountering the "hole" problem or "doubling" problem that is encountered in some prior art techniques that use motion vectors from the original frames to the virtual frame where either the motion vectors do not pass through a pixel position on the virtual frame or a motion vector from each of the original frames passes through the same pixel location on the virtual frame.

In an embodiment, the six affine parameters estimated in (A) are $a_{11}, a_{12}, a_{21}, a_{22}, b_1, b_2$ where the affine matrix A and the translation vector b are defined by:

$$A = \begin{bmatrix} a_{11} & a_{12} \\ a_{21} & a_{22} \end{bmatrix}$$

and $$\overline{b} = \begin{bmatrix} b_1 \\ b_2 \end{bmatrix},$$

the six 2-dimensional motion parameters in (B) are $\lambda_1, \lambda_2, \theta, \phi, b_1$ and $b_2$ where:

$$A = R(\theta)R(-\phi)LR(\phi)$$

and:

$$R(\alpha) = \begin{bmatrix} \cos(\alpha) & -\sin(\alpha) \\ \sin(\alpha) & \cos(\alpha) \end{bmatrix}$$

and $$L = \begin{bmatrix} \lambda_1 & 0 \\ 0 & \lambda_2 \end{bmatrix},$$

and the interpolated 2-dimensional motion parameters that represent motion from a region in an interpolated frame to said region in the first frame are $\lambda_1^b, \lambda_2^b, \theta^b, \phi^b, b_1^b$ and are obtained in (C) as:

$$\lambda_1^b = \frac{\lambda_1}{\lambda_1 + (1-\lambda_1)\Delta t}$$

$$\lambda_2^b = \frac{\lambda_2}{\lambda_2 + (1-\lambda_2)\Delta t}$$

$$\theta^b = \theta * \Delta t$$

$$\phi^b = \phi * \Delta t$$

$$b_1^b = b_1 * \Delta t$$

$$b_2^b = b_2 * \Delta t$$

where $\Delta t$ is the time interval from the first frame to the interpolated frame where the first and second frames are at times t and t+1 in arbitrary units and $0<\Delta t<1$.

In an embodiment, in (D) the first set of six affine parameters that represent motion from said region in the interpolated frame to said region in the first frame are $a_{11}^b, a_{12}^b, a_{21}^b, a_{22}^b, b_1^b, b_2^b$ where:

$$A^b = \begin{bmatrix} a_{11}^b & a_{12}^b \\ a_{21}^b & a_{22}^b \end{bmatrix}$$

and $$\bar{b}^b = \begin{bmatrix} b_1^b \\ b_2^b \end{bmatrix}$$

and $A^b$ is obtained using the formula:

$$A^b = R(\theta^b)R(-\phi^b)L^b R(\phi^b)$$

where $$L^b = \begin{bmatrix} \lambda_1^b & 0 \\ 0 & \lambda_2^b \end{bmatrix},$$

and said second set of six affine parameters that represent motion from said region in the interpolated frame to said region in the second frame are $a_{11}^f, a_{12}^f, a_{21}^f, a_{22}^f, b_1^f, b_2^f$ where:

$$A^f = \begin{bmatrix} a_{11}^f & a_{12}^f \\ a_{21}^f & a_{22}^f \end{bmatrix}$$

and $$\bar{b}^f = \begin{bmatrix} b_1^f \\ b_2^f \end{bmatrix}$$

which are obtained using the formulae:

$$A^f = A^{-1}A^b$$

$$\bar{b}^f = -A^{-1}(\bar{b} - \bar{b}^b)$$

where $A^{-1}$ is the inverse of the affine matrix A.

In this embodiment, having obtained the first set of ("backward") affine parameters to the first frame, it is relatively straightforward to obtain the second set of ("forward") parameters to the second frame.

In an embodiment, said region of the interpolated frame contains plural pixels, and in (E) the locating the position(s) and the obtaining of an interpolated intensity is carried out in respect of each of said plural pixels.

In an embodiment, it is determined that the respective regions in the first frame, the second frame and the interpolated frame correspond if they are at the same location with respect to the coordinate origin of their respective frames and have the same spatial extent.

In an embodiment, in (C):

two of the 2-dimensional motion parameters account for translation of a region from one frame to another and are interpolated linearly;

one of the 2-dimensional motion parameters accounts for rotation of a region from one frame to another and is interpolated linearly; and, the three remaining 2-dimensional motion parameters account for scaling and shearing of a region from one frame to another, one of said three remaining 2-dimensional motion parameters being interpolated linearly and the other two of said three remaining 2-dimensional motion parameters being interpolated non-linearly.

According to a second aspect of the invention, there is provided a method of increasing the frame rate of an input video signal by interpolating video frames between original video frames of the input video signal and inserting interpolated video frames between original video frames of the input video signal to produce an output video signal having a higher frame rate than the input signal, the method comprising:

for each of plural regions in a first frame of an input video signal and plural corresponding regions of a second frame of the input video signal:

(A) estimating eight homography parameters of an homography model that represent relative motion between a region in a first frame of an input video signal and a corresponding region in a second frame of the input video signal;

(B) interpolating said eight homography parameters for a time instant between the first and second frames to obtain eight interpolated homography parameters that represent motion from a region in an interpolated frame to at least one of (i) said region in the first frame and (ii) said region in the second frame, wherein the interpolated frame is to be inserted between the first and second frames and wherein said region in the interpolated frame corresponds to said regions in the first and second frames; and, (C) rendering the region of the interpolated frame by locating a position in (i) the first frame in the case that said interpolated homography parameters represent motion from the region in the interpolated frame to said region in the first frame, and/or (ii) the second frame in the case that said interpolated homography parameters represent motion from the region in the interpolated frame to said region in the second frame, said position corresponding to a pixel in said region of the interpolated frame and being located by using the respective eight interpolated homography parameters obtained in step (B), and obtaining an interpolated intensity of said pixel in said region of the interpolated frame as a function of the intensities at said position(s); and, having by (C) interpolated plural regions of the interpolated frame such that the whole of the interpolated frame has been obtained, inserting said interpolated frame between said first and second frames.

This aspect uses the homography transformation to map points between the original frames of the video sequence and to locate sub-pixel positions in one or both of the original frames that correspond to positions of pixels in the virtual frame. It is believed that the homography transformation has not been used previously in frame rate up-conversion, largely because of the complexity of interpolating the homography parameters which has been difficult to achieve in real time at reasonable cost in domestic consumer equipment for example. Various techniques for overcoming this problem are disclosed in more detail below.

As previously, the second frame may be subsequent to the first frame and the parameter interpolation carried out in a forward direction. Alternatively, and/or additionally the parameter interpolation may be backwards, or may be both backwards and forwards.

In an embodiment:

(B) comprises interpolating said eight homography parameters for a time instant between the first and second frames to obtain a first set of interpolated homography parameters that represent motion from a region in an interpolated frame to said region in the first frame, and interpolating said eight homography parameters for said time instant between the first and second frames to obtain a second set of interpolated homography parameters that represent motion from a region in an interpolated frame to said region in the second frame; and, (C) comprises obtaining the interpolated region of the interpolated frame by: locating the sub-pixel position in the first frame that corresponds to a pixel in said region of the interpolated frame by using said first set of respective homography parameters obtained in step (B), locating the sub-pixel position in the second frame that corresponds to a pixel in said region of the interpolated frame by using said second set of respective homography parameters obtained in step (B), and obtaining an interpolated intensity of said pixel in said region of the interpolated frame as a function of the intensities at said positions in the first and second frames.

In an embodiment, said region of the interpolated frame contains plural pixels, and the locating the position(s) and the obtaining of an intensity is carried out in respect of each of said plural pixels.

In an embodiment, it is determined that the respective regions in the first frame, the second frame and the interpolated frame correspond if they are at the same location with respect to the coordinate origin of their respective frames and have the same spatial extent.

In an embodiment:

(B) comprises interpolating said eight homography parameters for a time instant between the first and second frames to obtain eight interpolated homography parameters that represent motion from a region in an interpolated frame to said corresponding region in the first frame using the formula:

$$G_p^b = \Delta t(G_p - I) + I$$

where:

$G_p$ is the projective homography matrix that contains the eight homography parameters that represent motion from said region in the second frame of the input video signal to said corresponding region in the first frame of the input video signal, $\Delta t$ is the time interval from the first frame to the interpolated frame where the first and second frames are at times t and t+1 in arbitrary units and $0 < \Delta t < 1$, $G_p^b$ is the projective homography matrix that contains the eight interpolated homography parameters that represent motion from said region in the interpolated frame to said corresponding region in the first frame, and I is the identity matrix; and, (C) comprises obtaining the interpolated region of the interpolated frame by locating the sub-pixel position in the first frame that corresponds to a pixel in said region of the interpolated frame by using the interpolated homography parameters in $G_p^b$ and obtaining an interpolated intensity of said pixel in said region of the interpolated frame as a function of the intensity at said position.

This particular embodiment is especially useful when the so-called camera calibration matrices are not known. It relies on an assumption of small angles of rotation between the original frames of the video sequence and no zooming between the original frames of the video sequence, which are reasonable assumptions in many cases. This embodiment not only avoids the need to know the camera calibration matrices but also avoids the need to decompose the projective homography matrix to estimate the interpolated homography parameters, which is typically a complex process.

In an embodiment, the projective homography matrix $G_p^f$ that contains the eight interpolated homography parameters that represent motion from said region in the interpolated frame to said corresponding region in the second frame is obtained using the formula:

$$G_p^f = s G_p^{-1} G_p^b$$

where:

$G_p^{-1}$ is the inverse matrix of $G_p$, and s a scale factor; and, (C) comprises obtaining the interpolated region of the interpolated frame by locating the sub-pixel position in the first frame that corresponds to a pixel in said region of the interpolated frame by using the interpolated homography parameters in $G_p^b$; locating the sub-pixel position in the second frame that corresponds to said pixel in said region of the interpolated frame by using the interpolated homography parameters in $G_p^f$; and obtaining an interpolated intensity of said pixel in said region of the interpolated frame as a function of the intensities at said respective positions in the first and second frames.

In an embodiment:

(B) comprises interpolating said eight homography parameters for a time instant between the first and second frames to obtain eight interpolated homography parameters that represent motion from a region in an interpolated frame to said corresponding region in the first frame by:

(B1) obtaining the parameters of the Euclidean homography matrix $H_e$ where:

$$H_e = (K^t)^{-1} G_p K^{t+1}$$

where:

$G_p$ is the projective homography matrix that contains said eight homography parameters that represent motion from said region in the second frame of the input video signal to said corresponding region in the first frame of the input video signal, $(K^t)^{-1}$ is the inverse of the camera calibration matrix at time t+1 corresponding to the second frame; and $K^{t+1}$ is the camera calibration matrix at time t=1 corresponding to the second frame;

(B2) decomposing said Euclidean homography parameters into rotation, translation and structure parameters using the formula:

$$H_e = R - \bar{t}\bar{n}^T$$

where:

R is a rotation matrix, $\bar{t}$ is a normalized translational vector from time t+1 to t, and $\bar{n}$ is a surface normal;

(B3) selecting one of the solutions for R, $\bar{t}$ and $\bar{n}$ provided by the decomposition in B2;

(B4) obtaining a rotation angle θ of the rotation matrix R of the solution selected in B3;

(B5) calculating a camera zoom factor c between the first and second frames;

(B6) interpolating the rotation angle θ obtained in B4, the normalized translational vector $\bar{t}$ selected in B3 and the camera zoom factor c calculated in B5 as follows:

$$\theta^b = \theta * \Delta t$$

$$\bar{t}^b = \bar{t} * \Delta t$$

$$c^b = (c-1)\Delta t + 1$$

where:

$\Delta t$ is the time interval from the first frame to the interpolated frame where the first and second frames are at times t and t+1 in arbitrary units and $0 < \Delta t < 1$ and $\theta^b$, $t^b$, and $c^b$ are the rotation angle, normalized translational vector $\bar{t}$ and camera zoom factor relating to motion from said region in said interpolated frame to said corresponding region in the first frame; and, (B7) obtaining said eight interpolated homography parameters that represent motion from the region in the interpolated frame to the corresponding region in the first frame from $\theta^b$, $\bar{t}^b$ and $c^b$ thereby to obtain the projective homography matrix $G_p^b$ that contains said eight interpolated homography parameters; and, (C) comprises obtaining the interpolated region of the interpolated frame by locating the sub-pixel position in the first frame that corresponds to a pixel in said region of the interpolated frame by using the interpolated homography parameters in $G_p^b$ and obtaining an interpolated intensity of said pixel in said region of the interpolated frame as a function of the intensities at said position.

This particular embodiment is especially useful when the so-called camera calibration matrices are known as it leads to more realistic and natural looking results.

In an embodiment, the projective homography matrix $G_p^f$ that contains the eight interpolated homography parameters that represent motion from said region in the interpolated frame to said corresponding region in the second frame is obtained using the formula:

$$G_p^f = s G_p^{-1} G_p^b$$

where:
$G_p^{-1}$ is the inverse matrix of $G_p$, and
s a scale factor; and, (C) comprises obtaining the interpolated region of the interpolated frame by locating the sub-pixel position in the first frame that corresponds to a pixel in said region of the interpolated frame by using the interpolated homography parameters in $G_p^b$; locating the sub-pixel position in the second frame that corresponds to said pixel in said region of the interpolated frame by using the interpolated homography parameters in $G_p^f$; and obtaining an interpolated intensity of said pixel in said region of the interpolated frame as a function of the intensities at said respective positions in the first and second frames.

In an embodiment, in B3, the one of the solutions for R, $\bar{t}$ and $\bar{n}$ provided by the decomposition in B2 is selected by minimising a cost function that relates to values of R, $\bar{t}$ and $\bar{n}$ between plural pairs of frames.

Embodiments of the invention also extend to apparatus constructed and arranged to carry out methods as described above.

The preferred apparatus and/or methods may be incorporated into any apparatus and/or methods that are used to display or generate a video sequence, including for example an image processor used in a television set or the like, digital video cameras, digital image processing software which may be used in many applications, etc., etc. The invention has particular application in television and video streaming applications, including internet and network video servers, portable media players and video encoding, decoding and transcoding systems. The invention can be implemented at reasonable cost in an "on-the-fly" system implemented in consumer equipment. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the invention will now be described, by way of example, with reference to the accompanying drawings, in which.

The preferred embodiments of the invention provide a method and apparatus for up-converting the frame rate of a sequence of images by inter-frame interpolation, optimally in two directions (more specifically, backward from the "virtual" or "interpolated" frame to the previous frame of the original sequence, and forward from the interpolated frame to the next frame of the original sequence). The use of two particular parametric models is disclosed herein, namely the 6-parameter affine transformation and the (8-parameter) homography transformation. These models are well known in themselves, having application in computer graphics and computer/robot vision for example, and provide a mathematical description of region-to-region transformations. In other words, the models provide a mathematical description of relative movement of a region between two images (such as a frame pair of a video sequence). In the present context and in broad terms, these models are used as follows. The parameters of the model that represent the motion field between successive original frames are first calculated. Put simply, these parameters provide a description of relative movement between objects in a scene between a region in a first original frame and a corresponding region in a second original frame. Then the respective backward and forward model parameters that correspond to the frame to be interpolated are calculated from those model parameters relating to the original frames. Specific interpolation schemes, including certain parameter decomposition schemes where required, for achieving this particular step are disclosed in detail below. Then the backward and forward model parameters are used to identify the locations in the backward and forward frames respectively that correspond to the pixels on the virtual frame, and thus identify the pixels in the backward and forward frames respectively that correspond to the pixels on the virtual frame. Finally, the virtual frame is "interpolated" by obtaining the intensity of the pixels on the virtual frame as a function of the intensity of those corresponding pixels in the backward and forward frames. In a sense, the pixels on the virtual frame "go and grab" their intensities from the corresponding pixels on the backward and forward frames, the locations of those pixels being obtained using the preferred parameter decomposition and interpolation techniques discussed in more detail below. In the preferred embodiments discussed in more detail below, the effect of relative object-camera motion is better accounted for leading to better, more natural and realistic looking results with fewer undesirable artifacts in the interpolated frames.

Figure 1:
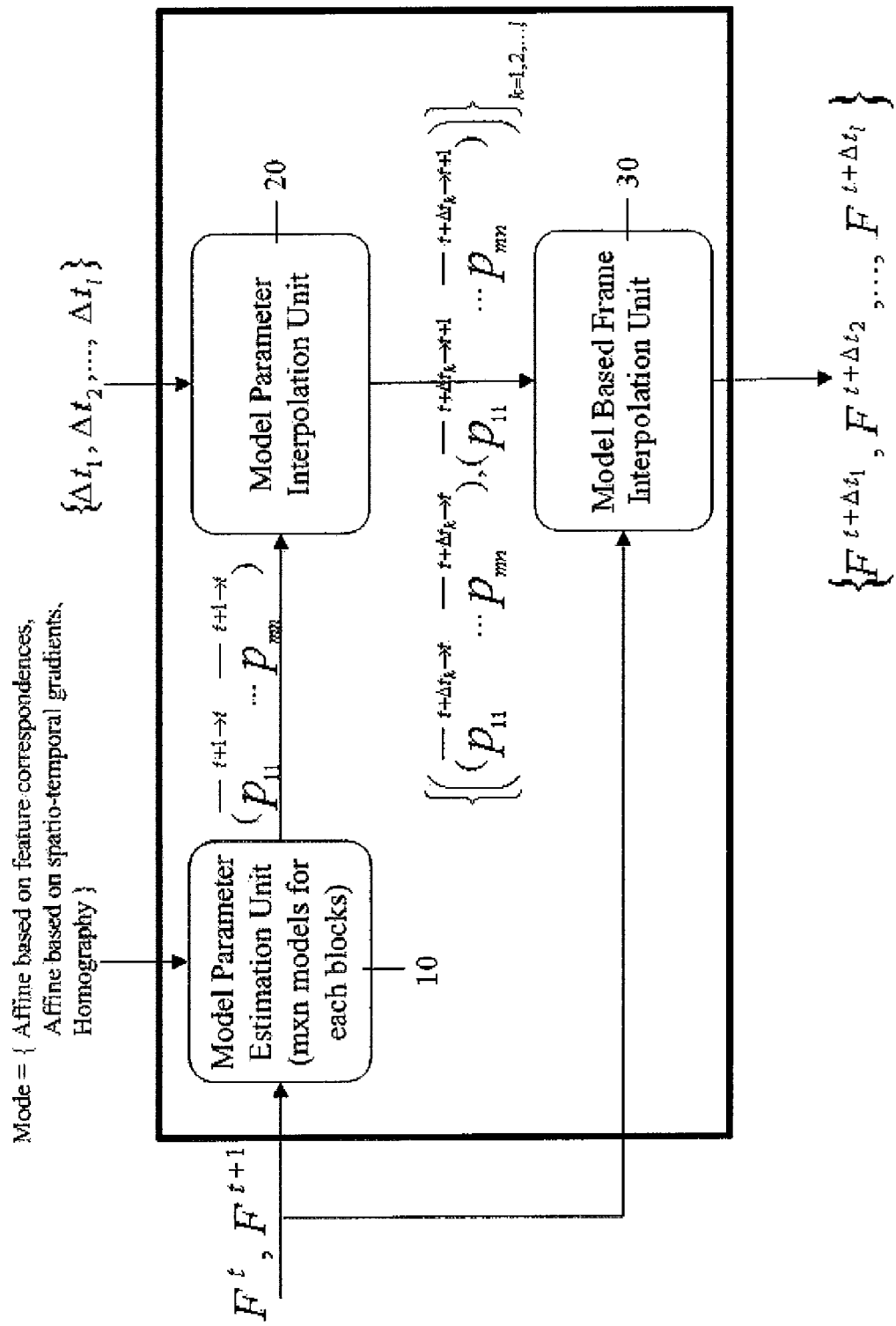
FIG. 1 shows schematically the main components of an example of an embodiment of the invention for the case where a camera calibration matrix is not available.
Figure 2:
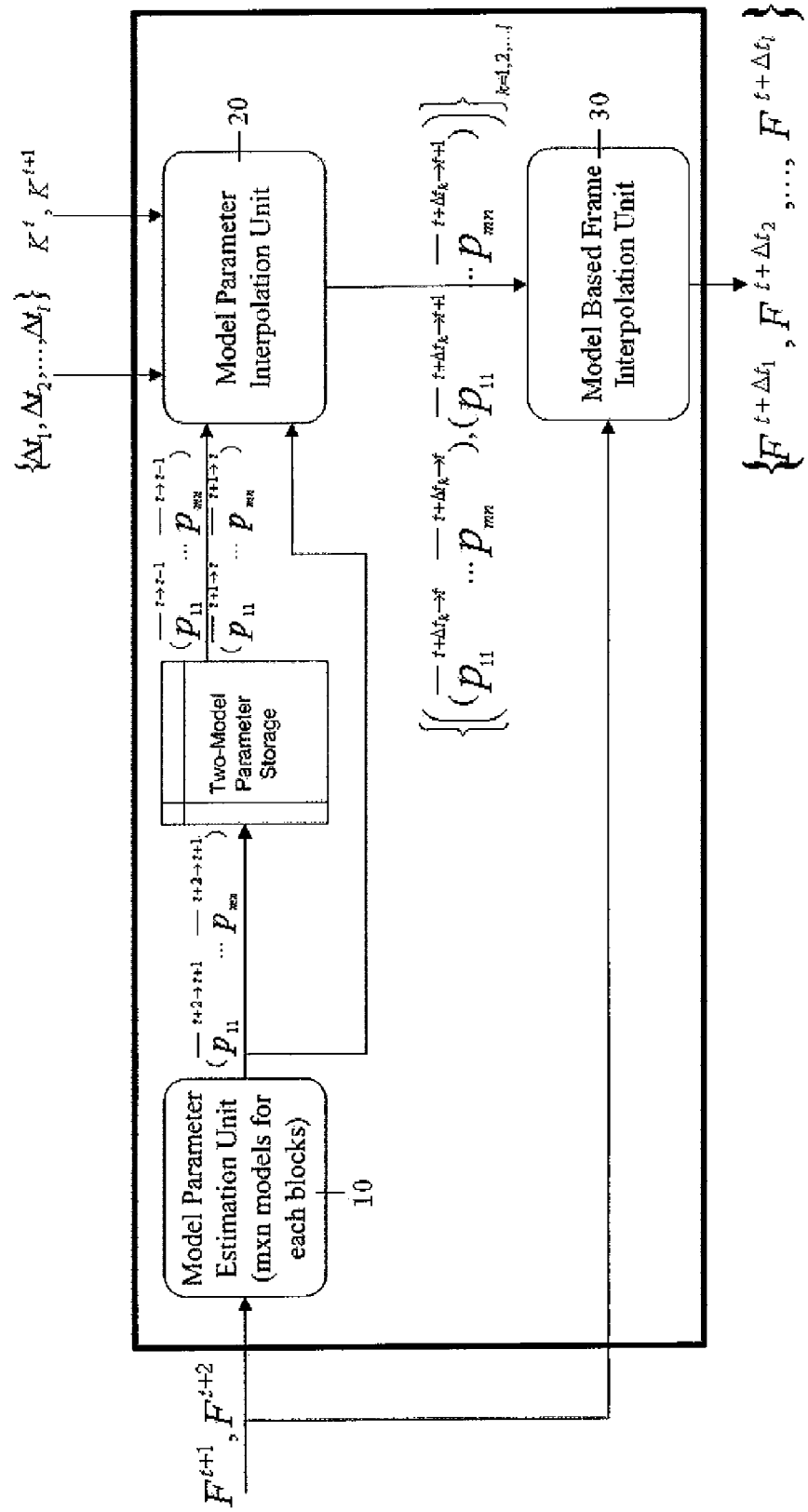
FIG. 2 shows schematically the main components of an example of an embodiment of the invention for the case where a camera calibration matrix is available.

Referring to FIGS. 1 and 2, the preferred embodiments of the invention comprise three main units, namely a model parameter estimation unit 10, a model parameter interpolation unit 20 and a model-based frame interpolation unit 30. The function of these units will be summarised briefly now and their detailed operation will be discussed further below. In much of the following description, for simplicity, a discussion will mainly be given in relation to interpolating and inserting a single frame between a pair of frames of an original video sequence. It will be well understood however that in general this will be repeated so as to obtain respective interpolated frames for inserting between all pairs of frames of the original video sequence. More than one frame, corresponding to plural time instants, may be interpolated and inserted between each pair of frames of the original video sequence. Similarly, the description will mainly be given in respect of a single region in the virtual frame, and the corresponding single regions in the pair of frames of the original video sequence, and it will be understood that this is preferably repeated for plural regions so that the whole of the virtual frame is interpolated correctly.

Model Parameter Estimation Unit 10

The model parameter estimation unit 10 calculates the parameters of the selected parametric model between all pairs of corresponding regions in the input pair of frames of the original video sequence. In the preferred embodiment, this is based on a predefined grid of regions that are at the same location with respect to each frame's coordinate origin and have the same spatial extent, that is, the same size and the same shape. In general, the regions may be any size, from as small as a pixel to as large as the whole frame itself, and may have a shape that is regular (such as triangular, square, rectangular or any other regular shape) or irregular, and may be overlapping or non-overlapping.

In general, various methods may be used to calculate the parameters of the selected parametric model between all pairs of corresponding regions in the input pair of frames. The method used may be one that is in itself known in the prior art. In the context of the preferred embodiments, the parameters that are calculated are the parameters of an affine transformation or a homography transformation that provide a mapping between the respective regions in the input pair of frames.

2. Model Parameter Interpolation Unit 20

Given the model parameters between the regions of an input pair of frames as calculated by the model parameter estimation unit 10, the model parameter interpolation unit 20 calculates one or both of the forward and backward parameters of the parametric model for one point in time (if a single frame is to be interpolated and inserted between each of the input pairs of frames) or for more than one point in time (if plural frames are to be interpolated and inserted between each of the input pairs of frames) between the regions of the input pair of frames. As mentioned above, in this context and in relation to the preferred embodiments, "backward" is from the virtual or interpolated frame to the previous frame of the original sequence (i.e. the earlier of an input pair of frames), and "forward" is from the interpolated frame to the next frame of the original sequence (i.e. the later of an input pair of frames). In the notation used herein, the input pair of frames are at times t and t+1 respectively, and the virtual frame is at a point in time t+Δt where 0<Δt<1.

This element of the preferred embodiments is a particularly important contributor to the effectiveness of the preferred embodiments in producing more natural and realistic looking results with fewer undesirable artifacts in the interpolated frames.

3. Model-Based Frame Interpolation Unit 30

The model-based frame interpolation unit 30 interpolates the virtual frame for all regions using the (backward, or forward, or both backward and forward) model parameters that were calculated in the model parameter interpolation 20. The intensity of pixels in the interpolated frame is obtained by looking at the intensities of corresponding pixels in one or both of the backward and forward frames, as the case may be, and taking a weighted average.

The preferred embodiments make use of either the 6-parameter affine transformation or, particularly in the case that the so-called camera calibration matrix is available, the (8-parameter) homography transformation.

Affine and Homography Transformations

A brief discussion of affine and homography transformations will now be given.

As is known per se, given the coordinates of a point $\bar{x}=[x\ y]^T$ in an image, the 6-parameter (2D) affine transformation maps a point $\bar{x}$ to another location $\bar{x}'=[x'\ y']^T$ with respect to the same image origin as follows:

$$\bar{x}' = A * \bar{x} + \bar{b} \qquad (1)$$

where:

$$A = \begin{bmatrix} a_{11} & a_{12} \\ a_{21} & a_{22} \end{bmatrix}$$

and $$\bar{b} = \begin{bmatrix} b_1 \\ b_2 \end{bmatrix}$$

where $a_{11}$, $a_{12}$, $a_{21}$, $a_{22}$, $b_1$ and $b_2$ are the 6 affine parameters. A is commonly referred to as the affine matrix and accounts for linear transformations (i.e. rotation, scaling and shearing) and b is a vector that accounts for translation.

As is known per se, homogeneous coordinates allow affine transformations to be easily represented in matrix form. In homogeneous coordinates, the affine transformation may be $$\begin{bmatrix} x' \\ y' \\ 1 \end{bmatrix} = \begin{bmatrix} a_{11} & a_{12} & b_1 \\ a_{21} & a_{22} & b_2 \\ 0 & 0 & 1 \end{bmatrix} \begin{bmatrix} x \\ y \\ 1 \end{bmatrix}$$

It may be noted that each element of an input point $\bar{x}=[x\ y]^T$ depends linearly on the elements of the output point $\bar{x}'=[x'\ y']^T$:

$$x'=a_{11}x+a_{12}y+b_1 \text{ and } y'=a_{21}x+a_{22}y+b_2$$

In general, an affine transformation is composed of four linear transformations: rotation, scaling, shearing and translation. It may be noted that:

(i) for a pure translation from one point to another:

$$A = \begin{bmatrix} 1 & 0 \\ 0 & 1 \end{bmatrix},$$

$$b = \begin{bmatrix} t_1 \\ t_2 \end{bmatrix}$$

(ii) for a pure rotation around the centre point:

$$A = \begin{bmatrix} \cos(\theta) & -\sin(\theta) \\ \sin(\theta) & \cos(\theta) \end{bmatrix},$$

$$b = \begin{bmatrix} 0 \\ 0 \end{bmatrix}$$

(iii) for pure scaling:

$$A = \begin{bmatrix} s_1 & 0 \\ 0 & s_2 \end{bmatrix},$$

$$b = \begin{bmatrix} 0 \\ 0 \end{bmatrix}$$

(iv) and for pure shearing:

$$A = \begin{bmatrix} 1 & h_1 \\ 0 & 1 \end{bmatrix},$$

$$b = \begin{bmatrix} 0 \\ 0 \end{bmatrix}$$

(vertical shear)

or $$A = \begin{bmatrix} 1 & 0 \\ h_2 & 1 \end{bmatrix},$$

$$b = \begin{bmatrix} 0 \\ 0 \end{bmatrix}$$

(horizontal shear).

Several properties are invariant under affine transformation, such as parallelism, ratio of areas and ratio of lengths of parallel lines.

With regard to the use of affine transformation in the preferred embodiments of the invention, i.e. particularly given that in general there is a camera motion and scene structure changes between successive frames of a video sequence, the affine model is suitable for accommodating camera roll, camera zoom and the use of a camera with a large focal length (as an approximation to an affine camera) to capture a planar scene.

Homography transformation provides another way of mapping from a point at one location to another. The homography transformation between two points of in respective ones of a pair of images in homogeneous coordinates may be represented as:

$$\overline{x_h'} = s * H * \overline{x_h} \qquad (2)$$

where:
(a) the matrix $$H = \begin{bmatrix} h_{11} & h_{12} & h_{13} \\ h_{21} & h_{22} & h_{23} \\ h_{31} & h_{32} & 1 \end{bmatrix}$$

is the homography matrix
(b) s is the scale factor, and
(c)

$$\overline{x}_h = \begin{bmatrix} x \\ y \\ 1 \end{bmatrix}$$

and $$\overline{x}_h' = \begin{bmatrix} x' \\ y' \\ 1 \end{bmatrix}$$

are the source and mapped image locations in homogeneous coordinates respectively.

Although the homography matrix has 9 elements, only the ratio of these elements is significant. Thus, in fact the homography transformation has 8 degrees of freedom, and the final element of H, $h_{33}$, is conventionally normalized to 1.

It may be noted that each element of an input point $\overline{x} \pm [x\ y]^T$ depends non-linearly on the elements of the output point $\overline{x}' = [x'\ y']^T$:

$$x' = \frac{h_{11}x + h_{12}y + h_{13}}{h_{31}x + h_{32}y + 1}$$

and $$y' = \frac{h_{21}x + h_{22}y + h_{23}}{h_{31}x + h_{32}y + 1}$$

With regard to the use of homography transformations in the preferred embodiments of the invention, the homography model is suitable for modelling the induced 2D motion field when there is only camera rotation and/or zoom; and/or when the captured scene is planar or nearly planar (or at least a part of the scene for which a homography will be computed), and/or when the camera focal length is much greater than the variation in scene depth. Similarly to the affine case, the homography transformation can be decomposed into a camera rotation around an axis with some angle, a plane normal and a normalized camera translation, which constitute the structure of the scene and the camera motion.

A detailed description of examples of the preferred embodiments of the invention will now be given.

Affine and Homography Parameter Estimation

As noted above, the model parameter estimation unit 10 estimates or calculates the parameters of the selected parametric model between all pairs of corresponding regions in the input pair of frames of the original video sequence. In general, in the preferred embodiments, any suitable method for achieving this may be used. In the preferred embodiments, this is done in respect of relative movement from the second (later) frame to the first (earlier) frame (backward estimation), though it is possible to carry out this procedure in respect of relative movement from the first (earlier) frame to the second (later) frame (forward estimation).

Several approaches for estimating the parameters of the affine model are known in the prior art and in principle any of these can be used for this aspect of this embodiment. Among them, the two most commonly used are feature- or region-based methods and gradient-based methods.

In feature-based correspondence mode, the model parameter estimation unit 10 calculates the affine model parameters by first estimating the motion between the original input frames. Motion estimation may be carried out at sparse points by extracting features and tracking them so that a set of correspondences are constructed between the two frames. As an example, this may be realized by first finding the corner points in the first frame with a corner detection algorithm, such as a "Harris detector", which is known per se, and then tracking them as they move relatively to the second frame with a tracker, such as "Kanade-Lucas tracker" (KLT), which is also known per se. Alternatively, features can be extracted from both of the frames using a feature detector algorithm, such as a "scale-invariant feature transform" (SIFT), which is known per se, and then matched with a distance or correlation metric. In order to decrease the computational complexity, still another alternative is estimating a dense motion field in blocks with block matching or frequency domain based algorithms such as hexagonal search and phase correlation, which are known per se. After the motion estimation step, the model parameter estimation unit 10 calculates 6 affine parameters using for example a least squares optimization method or a robust algorithm, such as "RANSAC" (RANdom SAmple Consensus) or PROSAC (PROgressive SAmple Consensus).

On the other hand, in spatio-temporal gradients mode, the model parameter estimation unit 10 calculates the affine motion parameters directly from the spatio-temporal gradients of the input frames (see for example J. Shi and C. Tomasi, "Good Features To Track", in Proc. IEEE International Conf. Computer Vision and Pattern Recognition (CVPR). IEEE Press, 1994).

Similarly, several approaches for estimating the parameters of the homography model are known in the prior art and in principle any of these can be used for this aspect of this embodiment. In a preferred embodiment, similarly to the feature-based correspondence mode for estimating the affine model parameters discussed above, the model parameter estimation unit 10 calculates the homography model parameters by first computing a point correspondence field between the two original frames and then carrying out an optimization process to estimate the 8 parameters of the homography model (see for example Richard Hartley, Andrew Zisserman, "Multiple View Geometry in Computer Vision", Cambridge University Press, New York, N.Y., 2003).

Each of these alternatives for estimating the affine and homography parameters may be implemented in the same model parameter estimation unit 10 and the user or operator given the option to select between them.

As noted above, given the model parameters between the regions of an input pair of frames as calculated by the model parameter estimation unit 10, the model parameter interpolation unit 20 calculates one or both of the forward and backward parameters of the parametric model for one point in time (if a single frame is to be interpolated and inserted between each of the input pairs of frames) or for more than one point in time (if plural frames are to be interpolated and inserted between each of the input pairs of frames) between the regions of the input pair of frames. Thus, the input to the model parameter interpolation unit 20 are the model parameters from the frame at time t+1 back to the frame at time t for all regions which are calculated by the model parameter estimation unit 10.

For ease of explanation, the operation the model parameter interpolation unit 20 will now be described for only one point in time (i.e. only a single frame is to be interpolated) and for only one image region. Additionally, regions are represented by blocks, even though the definition of a region is not restricted to a block. The same procedure can certainly be applied for all regions in more than one interpolation frame, and for all possible examples of regions.

Figure 3:
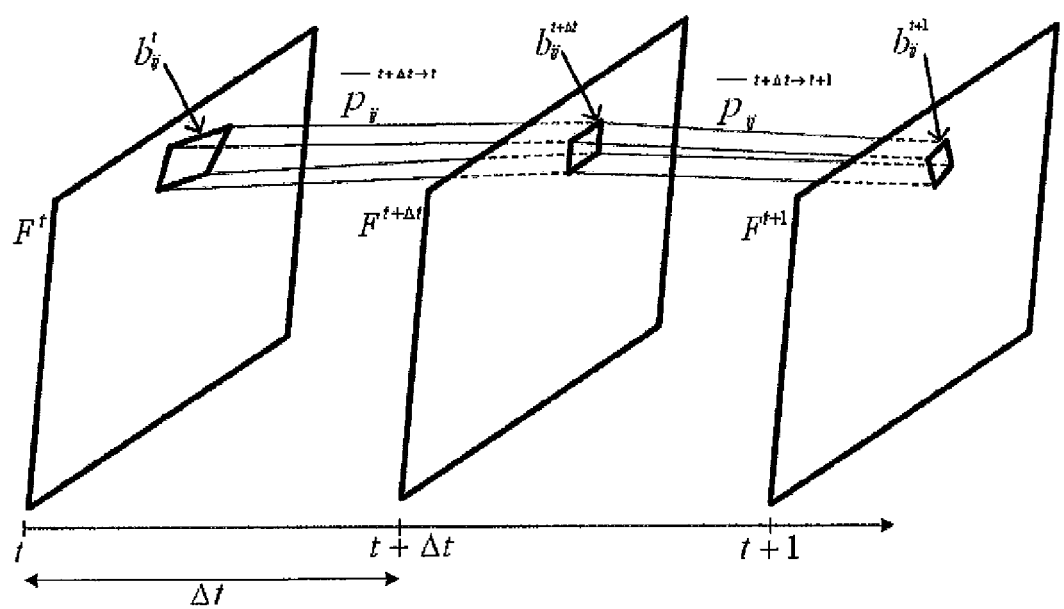
FIG. 3 shows schematically the relation between a predefined rectangular region in a virtual frame and the corresponding (warped) regions in the backward and forward frames respectively as employed in embodiments of the invention.
Figure 4:
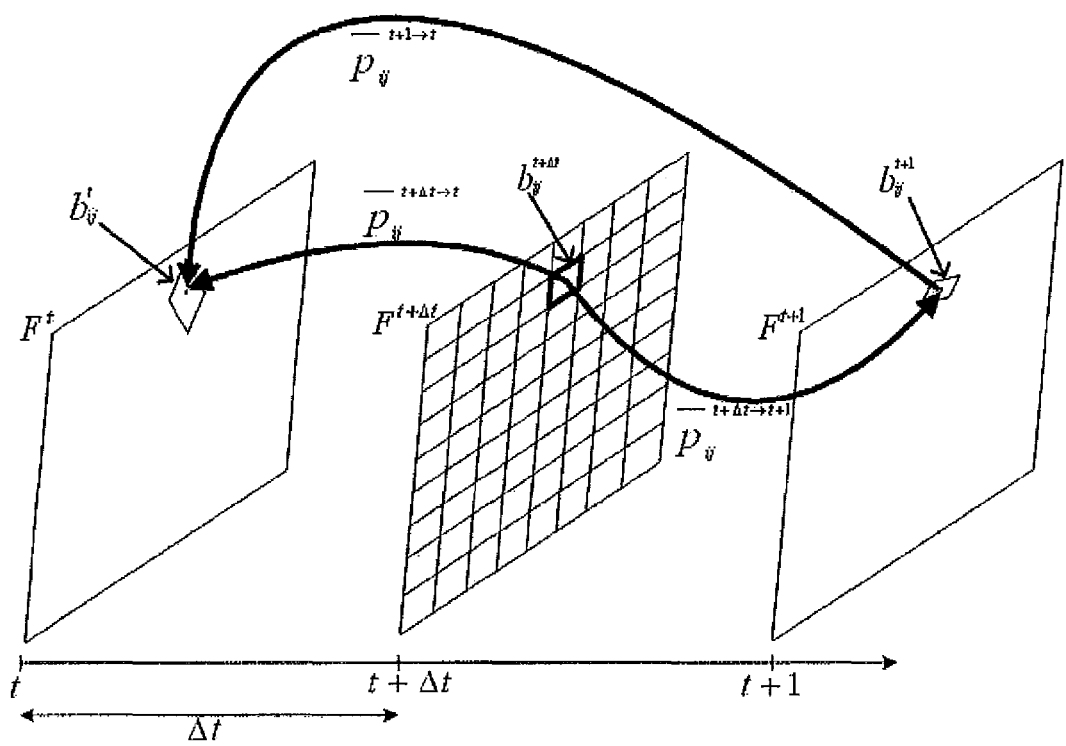
FIG. 4 shows schematically the directions of region to region mappings between the virtual frame and the backward and the forward frames as employed in embodiments of the invention; and, FIG. 5 shows schematically a world plane and camera movement between successive frames at time t and t+1 in order principally to illustrate the notation used in the description of some embodiments of the invention below.

Let the frames at time t and t+1 be denoted by $F^t$ and $F^{t+1}$ respectively. The virtual frame that is to be generated (i.e. interpolated) at time $t+\Delta t$ can be similarly denoted by $F^{t+\Delta t}$, where $0<\Delta t<1$. Let also the backward parameter array for the block at the $i^{th}$ row 120 and $j^{th}$ column location from the later original frame $F^{t+1}$ to the earlier original frame $F^t$ be denoted by $\bar{p}_s^{t+1 \to t}$. The corresponding backward model parameters (from the virtual frame $F^{t+\Delta t}$ to the earlier original frame $F^t$) and forward model parameters (from the virtual frame $F^{t+\Delta t}$ the later original frame $F^{t+1}$) of the virtual frame $F^{t+\Delta t}$ are then calculated by a parameter decomposition procedure. In general terms, the parameter decomposition procedure can be expressed as:

$$\bar{p}_{ij}^{t+\Delta t \to t} = g(\bar{p}^{t+1 \to t}, \Delta t) \quad (3)$$

$$\bar{p}_{ij}^{t+\Delta t \to t+1} = f(\bar{p}_{ij}^{t+1 \to t}, \Delta t) \quad (4)$$

where $\bar{p}_{ij}^{t+\Delta t \to t}$ is the parameter array for the backward field (i.e. from the frame $F^{t+\Delta t}$ to $F^t$), $\bar{p}_{ij}^{t+\Delta t \to t+1}$ is the parameter array for the forward field (i.e. from the frame $F^{t+\Delta t}$ to $F^{t+1}$), and g and f are the decomposition functions for the backward and forward directions respectively. FIG. 3 shows schematically the relationship between a defined rectangular region $b_{ij}^{t+\Delta t}$ in the virtual frame ($F^{t+\Delta t}$) and the corresponding (warped) regions $b_{ij}^t$ and $b_{ij}^{t+1}$ in the backward (F) and forward ($F^{t+1}$) frames respectively. For illustrative purposes, the corners of the three respective regions are connected with lines only even though the underlying mappings $\bar{p}_{ij}^{t+\Delta t \to t+1}$ and $\bar{p}_{ij}^{t+\Delta t \to t}$ of each point belonging to $b_{ij}^{t+\Delta t}$ are not linear in time. Figure shows schematically the utilized directions of region to region mappings for rendering the virtual frame, namely (i) from the later original frame to the earlier original frame, (ii) from the virtual frame to the later original frame and (iii) from the virtual frame to the earlier original frame. Again, for illustrative purposes, a grid of non-overlapping rectangular blocks is shown and the rendering scheme that is illustrated uses both the backward and forward parameters from the virtual frame.

Backward and forward parameter arrays are formed by simply concatenating the parameters of the selected transformation models. Therefore, the lengths of these parameter arrays for affine and homography mappings are different. For example, the parameter array $\bar{p}_{ij}^{t+\Delta t \to t}$ of an affine mapping $$A' = \begin{bmatrix} a_{11} & a_{12} & b_1 \\ a_{21} & a_{22} & b_2 \\ 0 & 0 & 1 \end{bmatrix}$$

may be defined as:

$$\bar{p}_{ij}^{t+\Delta t \to t} = \begin{bmatrix} a_{11} \\ a_{12} \\ a_{21} \\ a_{22} \\ b_1 \\ b_2 \end{bmatrix}$$

and the parameter array $\bar{p}_{ij}^{t+\Delta t \to t}$ of a homography mapping $$H = \begin{bmatrix} h_{11} & h_{12} & h_{13} \\ h_{21} & h_{22} & h_{23} \\ h_{31} & h_{32} & 1 \end{bmatrix}$$

may be defined as:

$$\bar{p}_{ij}^{t+\Delta t \to t} = \begin{bmatrix} h_{11} \\ h_{12} \\ h_{13} \\ h_{21} \\ h_{22} \\ h_{23} \\ h_{31} \\ h_{32} \end{bmatrix}$$

The decomposition functions g and f that are given in equations 3 and 4 above are different for the affine and the homography transformations, as will now be described.

Affine Parameter Interpolation

In order to calculate a meaningful affine parameter set to define the flow or motion between the virtual frame $F^{t+\Delta t}$ and the two original frames, it is not appropriate simply to interpolate all of the affine parameters between the original frames (as obtained above) themselves. This is because some of these parameters (i.e., $a_{11}$, $a_{12}$, $a_{21}$, $a_{22}$) do not directly correspond to the actual parameters of motion (such as 2D rotation and 2D scaling for the affine transformation case) between the corresponding regions. Accordingly, it is necessary to express $\bar{p}_{ij}^{t+1 \rightarrow t}$, the backward parameter array from the later original frame $F^{t+1}$ to the earlier original frame $F^t$, in terms of some other parameters of induced motion, which provide a much better representation of the real motion. This can be achieved by affine parameter decomposition, where the 6 affine parameters relating to affine motion between the two original frames are decomposed into 6 parameters of 2D motion between the two corresponding regions of the original frames. As mentioned previously, these motion parameters are rotation, scaling, shearing and translation. It may be noted that the decomposition is required only for the four affine parameters, i.e. those contained in the matrix $$A = \begin{bmatrix} a_{11} & a_{12} \\ a_{21} & a_{22} \end{bmatrix},$$

since the translational parameters $b_1$, $b_2$ are already in decomposed form.

To achieve this in one preferred embodiment, the affine matrix A is uniquely decomposed into two fundamental transformations, namely rotation and non-isotropic scaling:

$$A = R(\theta)R(-\phi)LR(\phi) \quad (5)$$

(see for example Richard Hartley, Andrew Zisserman, "Multiple View Geometry in Computer Vision", Cambridge University Press, New York, N.Y., 2003), where $R(\theta)$ and $R(\phi)$ are 2D rotation matrices:

$$R(\alpha) = \begin{bmatrix} \cos(\alpha) & -\sin(\alpha) \\ \sin(\alpha) & \cos(\alpha) \end{bmatrix} \quad (6)$$

and L is a diagonal matrix:

$$L = \begin{bmatrix} \lambda_1 & 0 \\ 0 & \lambda_2 \end{bmatrix} \quad (7)$$

In this decomposition, $R(\theta)$ accounts for rotation and $R(-\phi)LR(\phi)$ accounts for both non-isotropic scaling and shearing (translation being accounted for by the translation vector $$\bar{b} = \begin{bmatrix} b_1 \\ b_2 \end{bmatrix}$$

of course).

The decomposition can be realized by the "singular value decomposition" (a technique known per se) of the matrix A:

$$A = UDV^T = (UV^T)(VDV^T) = R(\theta)R(-\phi)LR(\phi) \quad (8)$$

As a result of the SVD decomposition, two orthogonal matrices $UV^T$ and $V^T$ and one diagonal matrix D are obtained corresponding to the matrices $R(\theta)$, $R(\phi)$ and L of the decomposed parameters. It should be noted that the elements of $UV^T$ and $V^T$ may not match the form given in Equation 6. In other words, the orthogonal matrices $UV^T$ and $V^T$ (which may have a determinant of either 1 or −1) may not be in the form of a rotation matrix (which has a determinant of 1). To convert them into the forms given in equations (6), it may be necessary to carry out an interchange or negation operation on the columns of $UV^T$ and $V^T$, and on the diagonal elements of D. Note that, since an affinity may be orientation-reversing, the diagonal elements of the matrix L are not necessarily positive and hence the elements of D can be negated so as to express $UV^T$ and $V^T$ in the required rotation matrix form. These techniques in themselves are all well known.

In the most preferred embodiment relating to use of the affine transform model, the parameters $\lambda_1, \lambda_2, \theta$ and $\phi$ that are decomposed through the above procedure together with the translational elements $b_1$ and $b_2$ can be interpolated at the time instant t+Δt (0<Δt<1) as follows:

$$\lambda_1^b = \frac{\lambda_1}{\lambda_1 + (1 - \lambda_1)\Delta t} \quad (9)$$

$$\lambda_2^b = \frac{\lambda_2}{\lambda_2 + (1 - \lambda_2)\Delta t}$$

$$\theta^b = \theta * \Delta t$$

$$\phi^b = \phi * \Delta t$$

$$b_1^b = b_1 * \Delta t$$

$$b_2^b = b_2 * \Delta t$$

The above equations follow from the assumptions of constant angular and translational velocities within the time span of (t+1)−(t). Additionally, for the scale factors ($\lambda_1$ and $\lambda_2$), it is assumed that the rate of change in focal length between the original frames is constant and that the change is much smaller than the focal length, which is quite reasonable for the cases where camera focal length changes (isotropic case) or the camera/object moves along the direction of the principal axis. It may be noted that all 6 of the decomposed parameters of 2D motion are interpolated in this preferred embodiment. It may further be noted that $\lambda_1$ and $\lambda_2$ are interpolated non-linearly, which provides a better, more accurate estimate for these parameters, whereas the other parameters are interpolated linearly, which is computationally more straightforward and sufficiently accurate in the present context. In principle, other interpolation schemes may be applied for interpolating these 6 parameters of 2D motion.

Bearing in mind that the preferred model parameter estimation unit 10 calculates the affine parameters in respect of relative movement from the second (later) frame $F^{t+1}$ to the first (earlier) frame $F^t$, the interpolated 2D motion parameters that are output by this method as implemented in the model parameter interpolation unit 20 are representative of the transformation of the region or block at the (i,j) location backwards from the virtual frame $F^{t+\Delta t}$ to the earlier original frame $F^t$ and forward from the virtual frame $F^{t+\Delta t}$ to the later original frame $F^{t+1}$.

Keeping in mind that what is being sought here in this preferred embodiment are the affine parameters that relate to movement between the virtual frame and both the earlier and the later original frames, Equation 5 can now be used to extract the backward affine parameters $\bar{p}_{ij}^{t+\Delta t \rightarrow t}$ that relate to movement from the virtual frame to the earlier original frame from the interpolated 2D motion parameters as follows:

$$A^b = R(\theta^b)R(-\phi^b)L^b R(\phi^b)$$

where $$L^b = \begin{bmatrix} \lambda_1^b & 0 \\ 0 & \lambda_2^b \end{bmatrix}$$

and $A^b$ is the affine matrix of $\bar{p}_{ij}^{t+\Delta t \to t}$. Similarly, the translational elements of $\bar{p}_{ij}^{t+\Delta t \to t}$ are $$\bar{b}^b = \begin{bmatrix} b_1^b \\ b_2^b \end{bmatrix}.$$

The forward parameters $\bar{p}_{ij}^{t+\Delta t \to t+1}$ that relate to movement from the virtual frame to the later original frame can easily be calculated from the parameters $\bar{p}_{ij}^{t+1 \to t}$ and $\bar{p}_{ij}^{t+\Delta t \to t}$. For example, let the affine matrix and the translational vector of $\bar{p}_{ij}^{t+\Delta t \to 1}$ be $A^f$ and $\bar{b}^f$ respectively. The inverse of this transformation is:

$$A_{inv}^f = (A^f)^{-1}$$

$$\bar{b}_{inv}^f = -A_{inv}^f \bar{b}^f$$

Let also $\bar{x}$ be a point in the later original frame $F^{t+1}$. Transforming this point from $F^{t+1}$ to $F^t$ is equivalent to transforming it first from $F^{t+1}$ to $F^{t+\Delta t}$ and then from $F^{t+\Delta t}$ to $F^t$:

$$A\bar{x}+\bar{b} = A^b(A_{inv}^f \bar{x}+\bar{b}_{inv}^f)+\bar{b}^b$$

$$\Rightarrow A = A^b A_{inv}^f,$$

$$\Rightarrow \bar{b} = A^b \bar{b}_{inv}^f + \bar{b}^b$$

After some simplification, the forward affine matrix $A^f$ and the translation vector $\bar{b}^f$ of parameters $\bar{p}_{ij}^{t+\Delta t \to t+1}$ can then be expressed as:

$$A^f = A^{-1} A^b$$

$$\bar{b}^f = -A^{-1}(\bar{b} - \bar{b}^b) \quad (10)$$

In this way, the affine parameters relating to movement between the virtual frame and both the earlier and the later original frames are obtained.

Homography Parameter Interpolation with Unknown Camera Calibration

As is known per se and discussed in broad terms above, the homography mapping is a known technique for expressing the motion of a camera capturing a planar scene or rotation/zooming of a camera capturing an arbitrary scene. Suppose that the camera observes a planar scene (or, more specifically, suppose that only the scene points projected onto the block or region of interest are planar, since only one block is considered here) or the camera undergoes a rotational motion between time instants t and t+1. Two corresponding points $\bar{x}^t \in F^t$ and $\bar{x}^{t+1} \in F^{t+1}$, which belong to the corresponding blocks at the location (i,j) in the respective original pair of frames $F^t$ and $F^{t+1}$, are related by:

$$\bar{x}^t = s G_p \bar{x}^{t+1} \quad (11)$$

where $G_p$ is the projective homography matrix of the homography parameters $\bar{p}_{ij}^{t+1 \to t}$ and s is a scale factor.

The projective homography matrix $G_p$ can be further expressed in terms of camera calibration matrices $K^t$ at time t and $K^{t+1}$ at time t+1 and the Euclidean homography matrix $H_e$ as follows:

$$G_p = K^t H_e (K^{t+1})^{-1} \quad (12)$$

Camera calibration and camera calibration matrices are well known in themselves. Briefly, camera calibration relates the "real" three dimensional world that is viewed by a camera to the two dimensional image plane to which the image is captured or mapped by the camera.

Figure 5:
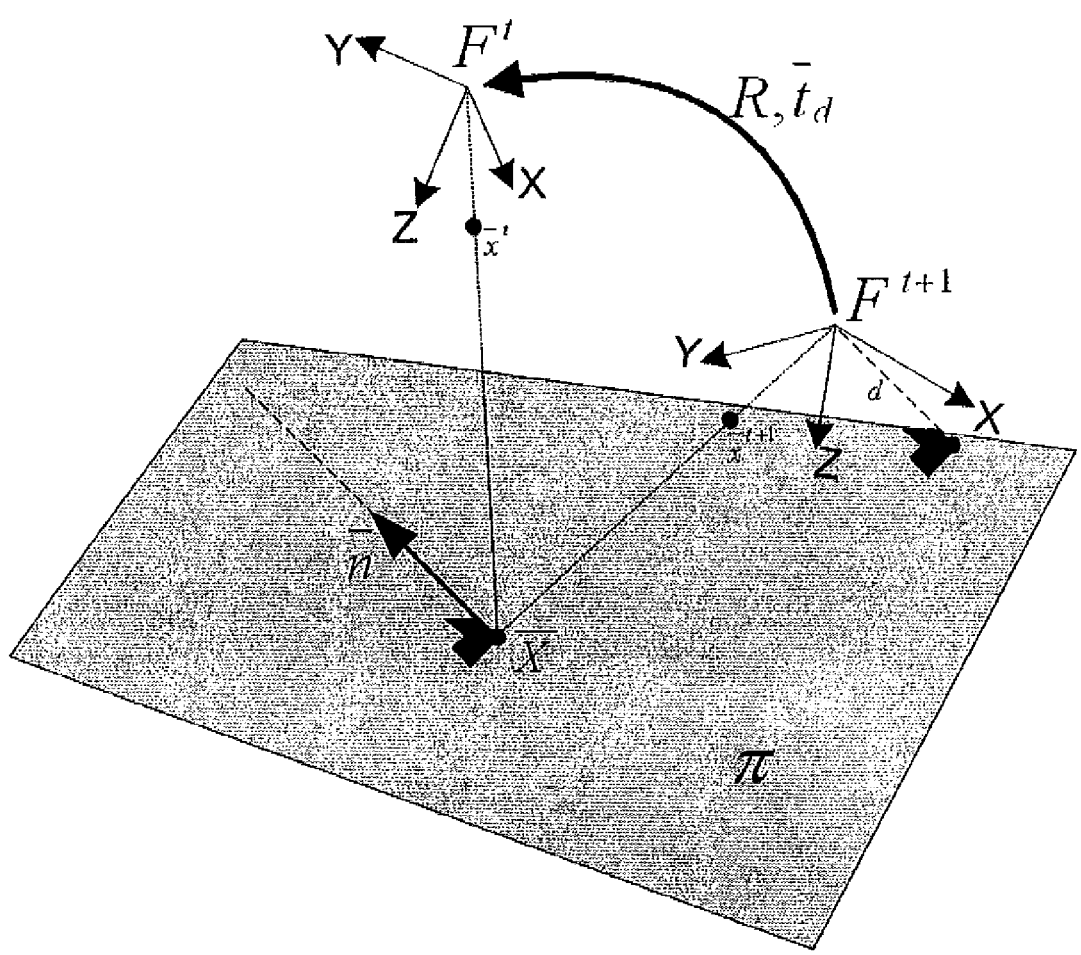

Next, suppose that observed world plane has coordinates $\pi = (\bar{n}^T, d)^T$, where $\bar{n}$ is the plane normal and d is the orthogonal distance of the plane from the camera at time t+1. Then, as known from for example Richard Hartley, Andrew Zisserman, "Multiple View Geometry in Computer Vision", Cambridge University Press, New York, N.Y., 2003, the Euclidean homography matrix $H_e$ can be decomposed into structure and motion elements as follows:

$$H_e = R - \bar{t}_d \bar{n}^T / d$$

where R is the rotation matrix and $\bar{t}_d$ is the translational vector from time t+1 to t. This is shown schematically in FIG. 5.

The normalized translation vector $\bar{t}$ is defined as $\bar{t} = \bar{t}_d/d$ and therefore Equation 12 can be rewritten as:

$$H_e = R - \bar{t}\bar{n}^T \quad (13)$$

In passing, it is noted that it can be seen from Equation 13 that, as a special case, the projective homography matrix of a purely rotating camera is composed only of the rotation matrix R (i.e. $\bar{t} = \bar{0}$ because there is no translation) and is an example of the infinite homography mapping.

Now, several approaches are known in the prior art for solving the decomposition problem stated above (i.e. the calculation or estimation of the rotation matrix R, the normalized translation vector $\bar{t}$ and the surface normal $\bar{n}$). Although for example analytical solutions are available, the decomposition of the Euclidean homography matrix introduces significant computational complexity, which makes these prior art methods difficult or impractical to implement at reasonable cost in an "on-the-fly" system implemented in consumer equipment, and also requires the internal camera calibration matrix to be available. It will be shown in the following that the decomposition can be avoided by a small angle approximation of rotation and an assumption of no zooming or constant focal length between the original frames at times t and t+1.

For the time being, as noted above, let the decomposed parameters be R, $\bar{t}$ and $\bar{n}$ for the rotation matrix, the normalized translation vector and the surface normal respectively.

As discussed in for example Richard Hartley, Andrew Zisserman, "Multiple View Geometry in Computer Vision", Cambridge University Press, New York, N.Y., 2003, the rotation R can be expressed as a rotation through an angle $\theta$ about an axis represented by the unit vector $\bar{a}$, which is called the angle-axis representation of rotation. Then, from the Rodrigues' rotation formula for a rotation matrix:

$$R = I + \sin(\theta)[\bar{a}]_x + (1-\cos(\theta))[\bar{a}]_x^2 \quad (14)$$

where I is the identity matrix.

The unit vector axis $\bar{a}$ can be found by solving $(R-I)\bar{a} = \bar{0}$ (i.e. finding the null space of R−I) and the rotation angle $\theta$ can be computed from the following relations using a two argument arctangent function (i.e. a full range or four quadrant arctangent function):

$$\cos(\theta) = (\text{trace}(R) - 1)/2 \quad (15)$$

$$\sin(\theta) = \frac{1}{2}\bar{a}^T \begin{bmatrix} R_{32} - R_{23} \\ R_{13} - R_{31} \\ R_{21} - R_{12} \end{bmatrix}$$

Similarly to Equation 9 in the preferred affine parameter interpolation described above, under the constant velocity assumption, the decomposed motion parameters of the rotation angle θ and the translation vector t can be interpolated at a time instant t+Δt (0<Δt<1) by a linear model:

$$\theta^b = \theta * \Delta t \quad (16)$$

$$\bar{t}^b = \bar{t} * \Delta t$$

Now, under the small angle approximation, the representation of the rotation matrix given in Equation 14 simplifies to:

$$R = I + \theta[\bar{a}]_x \quad (17)$$

Returning back to the discussion of homography decomposition, the projective homography matrix in Equation 12 can be re-expressed under the small angle approximation and using Equations 13 and 17 as follows:

$$G_p = K^t H_e (K^{t+1})^{-1} = K^t (R - \bar{m}^T)(K^{t+1})^{-1} = K^t (I + \theta[\bar{a}]_x - \bar{m}^T)(K^{t+1})^{-1}$$

For the sake of simplicity, it is further assumed that there is no zooming operation between time t and t+1 (i.e. $K^{t+1} = K^t$). Under these assumptions, the backward projective homography matrix $G_p^b$ of the interpolated homography parameters $\bar{p}_{ij}^{t+\Delta t \rightarrow t}$ that represent the transformation of the block at the location (i,j) from the virtual frame $F^{t+\Delta t}$ to the earlier original frame $F^t$ is:

$$G_p^b = K^t(I + \theta[\bar{a}]_x - \bar{t}^b \bar{n}^T)(K^t)^{-1} = (1 - \Delta t)I + \Delta t G_p \quad (18)$$

As can be seen from an inspection of Equation 18, using these assumptions of small angles and constant focal length, there is no need to decompose the Euclidean homography matrix $H_e$ nor know the camera calibration matrix K in order to obtain the backward projective homography matrix $G_p^b$ of the backward flow (from the virtual frame $F^{t+\Delta t}$ to the earlier original frame $F^t$) for a point at time t+Δt. On the contrary, given the projective homography matrix $G_p$ representing the motion field between the two original frames $F^t$ and $F^{t+1}$, the backward projective homography matrix $G_p^b$ of the backward flow (from the virtual frame $F^{t+\Delta t}$ to the earlier original frame $F^t$) for a point at time t+Δt can be found directly using the simple linear weighting scheme shown in Equation 18.

The forward parameters $\bar{p}_{ij}^{t+\Delta t \rightarrow t+1}$ can be easily calculated from the parameters $\bar{p}_{ij}^{t+1 \rightarrow t}$ and $\bar{p}_{ij}^{t+\Delta t \rightarrow t}$. Let the forward homography matrix of the forward parameters $\bar{p}_{ij}^{t+\Delta \rightarrow t+1}$ be $G_p^f$. Let also $\bar{x}$ be a point in the later original frame $F^{t+1}$. In the same manner as described above for the interpolation of the affine parameters, transforming this point from $F^{t+1}$ to $F^t$ is equivalent to transforming it first from $F^{t+1}$ to $F^{t+\Delta t}$ and then from $F^{t+\Delta t}$ to $F^t$. This leads to:

$$s_3 G_p x = s_2 G_p^b [s_1 (G_p^f)^{-1} x]$$

$$s_3 G_p G_p^f = s_1 s_2 G_p^b$$

$$G_p^f = s G_p^{-1} G_p^b$$

where $s = s_1 s_2 / s_3$ is a scale factor.

In this way, the homography parameters relating to movement between the virtual frame and both the earlier and the later original frames are obtained.

Homography Parameter Interpolation with Known Camera Calibration

As discussed above and demonstrated by Equations 12 and 13, decomposition of the Euclidean homography matrix $H_e$ (and hence projective homography matrix $G_p$) requires that the camera calibration matrices $K^t$ at time t and $K^{t+1}$ at time t+1 be known (it being recalled that this requirement for decomposition and knowledge of these Euclidean homography matrix and the camera calibration matrices is avoided using the assumptions of small angles and constant focal length between the original frames).

As mentioned above, several approaches are known in the prior art for solving this decomposition problem. For example, a suitable analytical method is disclosed in E. Malis and M. Vargas, "Deeper Understanding of the Homography Decomposition for Vision-Based Control", Institut National de Recherché en Informatique et en Automatique, ISSN 0249-6399 ISRN INRIA/RR-6303-FR+ENG, 2007. Independently of the actual method used, the decomposition yields a unique solution for the cases where the camera translates along the plane normal or undergoes pure rotation. For other cases, however, the decomposition yields four mathematically valid solutions, only two of which are physically valid. When the camera calibration matrix is known, the reference-point visibility constraint discussed in the research report by E. Malis and M. Vargas can be used to extract these two physically valid solutions. A selection then has to be made between these two physically valid solutions. A mean-based control law for this is presented in the same research report by E. Malis and M. Vargas. However, this prior art approach is complex and difficult to implement at reasonable cost in an "on-the-fly" system implemented in consumer equipment.

For the sake of simplicity, therefore, in order to select between the two physically valid solutions, a 4-frame decision rule (i.e. a rule based on four frames of the original video sequence) based on the constant surface normal direction is employed in the preferred embodiment that uses the homography transformation and when the camera calibration matrices are known.

In particular, let the pairs of physically valid solutions for the transformations between three pairs of frames from time t to t−1 (previous pair), t+1 to t (current pair) and t+2 to t+1 (next pair) be:

$$\{(R_1^t, \bar{t}_1^t, \bar{n}_1^t), (R_2^t, \bar{t}_2^t, \bar{n}_2^t)\},$$

$$\{(R_1^{t+1}, \bar{t}_1^{t+1}, \bar{n}_1^{t+1}), (R_2^{t+1}, \bar{t}_2^{t+1}, \bar{n}_2^{t+1})\}, \text{ and}$$

$$\{(R_1^{t+2}, \bar{t}_1^{t+2}, \bar{n}_1^{t+2}), (R_2^{t+2}, \bar{t}_2^{t+2}, \bar{n}_2^{t+2})\},$$

respectively, where the surface normal vectors n are all normalized to have unit length and the last element is always positive. The correct match (k, l, m) satisfies the relations:

$$\bar{n}_k^t = R_l^{t+1} \bar{n}_l^{t+1}$$

$$\bar{n}_l^{t+1} = R_m^{t+2} \bar{n}_m^{t+2}$$

Based on the constancy of the normal vector n across three successive pairs of frames, one way to find the best match for the transformation from time t+1 to t is to minimize the following objective function:

$$\min_{k,l,m} f(k, l, m) = \min_{k,l,m} \begin{pmatrix} \|\bar{n}_l^{t+1} - R_m^{t+2} \bar{n}_m^{t+2}\| + \\ \|\bar{n}_l^{t+1} - R_l^{t+1^T} \bar{n}_k^t\| + \\ \|R_m^{t+2} \bar{n}_m^{t+2} - R_l^{t+1^T} \bar{n}_k^t\| \end{pmatrix} \quad (20)$$

For the first frame in a shot of the video sequence, a 2-frame pair (from t+1 to t and from t+2 to t+1) version of the same objective can be utilized.

$$\min_{l,m} f(l, m) = \min_{l,m} (\|\bar{n}_l^{t+1} - R_m^{t+2} \bar{n}_m^{t+2}\|)$$

The result of this is an estimate of the decomposed homography parameters R, $\bar{t}$ and $\bar{n}$ for the rotation matrix, the normalized translation vector and the surface normal respectively relating to movement between the later of the original frames and the earlier of the original frames.

Another important issue regarding this example in which the camera calibration is known is the interpolation of the zoom factor. Suppose that the camera calibration matrices $K^t$ at time t and $K^{t+1}$ at time t+1 are not equal and, hence, that there is a zooming operation with a zoom factor of c between the original frames. For a finite projective camera, the relation between the respective camera calibration matrices can be written as follows:

$$K^{t+1} = K^t \begin{bmatrix} c_x & 0 & 0 \\ 0 & c_y & 0 \\ 0 & 0 & 1 \end{bmatrix} \quad (21)$$

Ideally, it is expected that $c_x = c_y$. However, due to process and observation noise, the two diagonal entries $c_x$ and $c_y$ may not be equal. Accordingly, in a preferred embodiment, the zoom factor c can be computed as the average of the first two diagonal elements of the product $(K^t)^{-1} K^{t+1}$. Then, in addition to using Equation 15 to obtain the rotation angle $\theta$ from the rotation matrix R and the relations in Equation 16 for the interpolation of the rotation angle $\theta$ and the translation vector $\bar{t}$, the zoom factor can also be interpolated at a time instant $t+\Delta t$ ($0<\Delta t<1$) under the assumption of constant rate of change in focal length as follows:

$$\theta^b = \theta^* \Delta t$$

$$\bar{t}^b = \bar{t}^* \Delta t$$

$$c^b = (c-1)\Delta t + 1 \quad (22)$$

Finally, using the angle axis representation of the rotation and similarly to Equation 18, the backward homography matrix $G_p^b$ of the interpolated homography parameters $\bar{p}_{ij}^{t+\Delta t \to t}$ from the virtual frame at $t+\Delta t$ to the earlier original frame at t can be obtained as follows:

$$G_p^b = K^t (I + \sin(\theta^b)[\bar{a}]_x + (1 - \cos(\theta^b))[\bar{a}]_x^2 - \bar{t}^b \bar{n}^T)(K^{t+\Delta t})^{-1} \quad (23)$$

where the camera calibration matrix at the interpolated point $t+\Delta t$ is $$K^{t+\Delta t} = K^t \begin{bmatrix} c^b & 0 & 0 \\ 0 & c^b & 0 \\ 0 & 0 & 1 \end{bmatrix}.$$

The calculation of the forward parameters $\bar{p}_{ij}^{t+\Delta t \to t+1}$ of the forward homography matrix $G_p^f$ is the same as set out in the derivation of Equation 19 above for the case that the camera calibration matrix is not known.

In this way, the homography parameters relating to movement between the virtual frame and both the earlier and the later original frames are obtained.

Model-Based Frame Interpolation

As the last stage of the frame rate up-conversion system, the model-based frame interpolation unit 30 interpolates frames, region by region, at time points $\{t+\Delta t_1, t+\Delta t_2, \ldots, t+\Delta t_1\}$ by using at least one of the backward and forward model parameters, and preferably both of the backward and forward model parameters, of each region obtained as described above.

For a virtual frame to be interpolated at time instant $t+\Delta t$, use is made of the same previously defined grid of regular or irregular and overlapping or non-overlapping regions for which the model parameters in the two opposite directions ($\bar{p}_{ij}^{t+\Delta t \to t}$ and $\bar{p}_{ij}^{t+\Delta t \to t+1}$) have been obtained. Depending on the selected mode, which preferably uses either the affine transformation of Equation 1 or the homography transformation of Equation 2, the corresponding positions are found in $F^t$ and $F^{t+1}$ for each pixel in a region of the virtual frame using the respective backward and forward parameters obtained as described above. In general terms, the intensity of each pixel in the interpolated frame is obtained as a function of the intensity of the pixels at the corresponding positions are found in $F^t$ and $F^{t+1}$. (It may be noted that for gray scale video, the "intensity" of a pixel is the gray value of the pixel (generally between 0 and 255). For colour video, the "intensity" of a pixel is the 3×1 vector of colour values of the pixel. If for example the RGB system is used, the colour values are the RGB values, each between 0 and 255.) If any of those corresponding positions in $F^t$ and $F^{t+1}$ is a sub-pixel location (i.e. a position that is not located precisely on a pixel location in the earlier or later original frames), an effective intensity value at that sub-pixel location may be obtained by interpolation of the intensity values at neighbouring pixel locations. Any suitable interpolation method may be used for this, such as the bilinear, bicubic and spline based methods.

In one example of this, let the intensity vector at an integer pixel location $\bar{x}^{t+\Delta t}$ in the virtual frame $F^{t+\Delta t}$ be denoted as $I^{t+\Delta t}(\bar{x}^{t+\Delta t})$ and the intensity vectors at the corresponding (sub-pixel) locations $\bar{x}^t$ in $F^t$ and $\bar{x}^{t+1}$ be $I^t(\bar{x}^t)$ and $I^{t+1}(\bar{x}^{t+1})$ respectively. Then, for the case of rendering with reference to both frames $F^t$ and $F^{t+1}$, the intensity vector $I^{t+\Delta t}(\bar{x}^{t+\Delta t})$ can be calculated by the following simple weighted linear averaging scheme:

$$I^{t+\Delta t}(\bar{x}^{t+\Delta t}) = \quad (24)$$

$$\begin{cases} (1 - \Delta t) I^t(\bar{x}^t) + \Delta t I^{t+1}(\bar{x}^{t+1}) & (\bar{x}^t \in F^t), (\bar{x}^{t+1} \in F^{t+1}) \\ I^t(\bar{x}^t) \ldots & (\bar{x}^t \in F^t), (\bar{x}^{t+1} \notin F^{t+1}) \\ I^{t+1}(\bar{x}^{t+1}) \ldots & (\bar{x}^t \notin F^t), (\bar{x}^{t+1} \in F^{t+1}) \end{cases}$$

where $\bar{x}^t \in F^t$ and $\bar{x}^t \notin F^t$ mean that the pixel $\bar{x}^t$ falls inside and outside the frame boundaries of $F^t$ respectively. It may be noted that there may be cases where both $\bar{x}^t$ and $\bar{x}^{t+1}$ do not fall inside frame boundaries. These points can be filled with the intensity values of the closest locations at which the intensities are calculated according to Equation 24.

For the cases where the interpolation is carried out using the pixel data of only one of the frames, only the second or the third lines of Equation 24 are used for interpolation from $F^t$ or $F^{t+1}$ respectively.

Thus, in this final stage, in a sense, the pixels on the virtual frame "go and grab" their intensities from the corresponding pixels on the backward and/or forward frames, the locations of those pixels having been obtained using the preferred parameter decomposition and parameter interpolation techniques discussed above. This leads to better, more natural and realistic looking results with fewer undesirable artefacts in the interpolated frames.

Embodiments of the invention have been described with particular reference to the examples illustrated. However, it will be appreciated that variations and modifications may be made to the examples described within the scope of the invention.

The invention claimed is:

1. A method of increasing the frame rate of an input video signal by interpolating video frames between original video frames of the input video signal and inserting interpolated video frames between original video frames of the input video signal to produce an output video signal having a higher frame rate than the input signal, the method comprising:
for each of plural regions in a first frame of an input video signal and plural corresponding regions of a second frame of the input video signal:
(A) estimating six affine parameters of an affine model that represent relative motion between a region in a first frame of an input video signal and a corresponding region in a second frame of the input video signal;
(B) decomposing said six affine parameters into six 2-dimensional motion parameters;
(C) interpolating the six 2-dimensional motion parameters for a time instant between the first and second frames to obtain interpolated 2-dimensional motion parameters that represent motion from a region in an interpolated frame to at least one of (i) said region in the first frame and (ii) said region in the second frame, wherein the interpolated frame is to be inserted between the first and second frames and wherein said region in the interpolated frame corresponds to said regions in the first and second frames;
(D) obtaining, from said interpolated 2-dimensional motion parameters, six affine parameters that represent (i) motion from said region in the interpolated frame to said region in the first frame in the case that said interpolated 2-dimensional motion parameters represent motion from the region in the interpolated frame to said region in the first frame and/or (ii) motion from said region in the interpolated frame to said region in the second frame in the case that said interpolated 2-dimensional motion parameters represent motion from the region in the interpolated frame to said region in the second frame; and,
(E) locating a position in (i) the first frame in the case that said interpolated 2-dimensional motion parameters represent motion from the region in the interpolated frame to said region in the first frame, and/or (ii) the second frame in the case that said interpolated 2-dimensional motion parameters represent motion from the region in the interpolated frame to said region in the second frame, said position corresponding to a pixel in said region of the interpolated frame and being located by using the respective six affine parameters obtained in step (D), and obtaining an intensity of said pixel in said region of the interpolated frame as a function of the intensities at said position(s); and,
having by (E) interpolated plural regions of the interpolated frame such that the whole of the interpolated frame has been obtained, inserting said interpolated frame between said first and second frames.

2. A method according to claim 1, wherein:
(C) comprises interpolating the six 2-dimensional motion parameters for a time instant between the first and second frames to obtain interpolated 2-dimensional motion parameters that represent motion from a region in an interpolated frame to said region in the first frame;
(D) comprises obtaining from said interpolated 2-dimensional motion parameters a first set of six affine parameters that represent motion from said region in the interpolated frame to said region in the first frame, and obtaining a second set of six affine parameters that represent motion from said region in the interpolated frame to said region in the second frame from said first set of six affine parameters that represent motion from said region in the interpolated frame to said region in the first frame and said six affine parameters that represent relative motion between said region in the first frame and said corresponding region in said second frame; and,
(E) comprises obtaining the interpolated region of the interpolated frame by: locating the sub-pixel position in the first frame that corresponds to a pixel in said region of the interpolated frame by using said first set of six affine parameters obtained in step (D), locating the sub-pixel position in the second frame that corresponds to a pixel in said region of the interpolated frame by using said second set of six affine parameters obtained in step (D), and obtaining an interpolated intensity of said pixel in said region of the interpolated frame as a function of the intensities at said positions in the first and second frames.

3. A method according to claim 2, wherein:
the six affine parameters estimated in (A) are $a_{11}$, $a_{12}$, $a_{21}$, $a_{22}$, $b_1$, $b_2$ where the affine matrix A and the translation vector b are defined by:

$$A = \begin{bmatrix} a_{11} & a_{12} \\ a_{21} & a_{22} \end{bmatrix} \text{ and }$$

$$\bar{b} = \begin{bmatrix} b_1 \\ b_2 \end{bmatrix},$$

the six 2-dimensional motion parameters in (B) are $\lambda_1$, $\lambda_2$, $\theta$, $\phi$, $b_1$ and $b_2$ where:

$$A = R(\theta)R(-\phi)LR(\phi)$$

and:

$$R(\alpha) = \begin{bmatrix} \cos(\alpha) & -\sin(\alpha) \\ \sin(\alpha) & \cos(\alpha) \end{bmatrix} \text{ and }$$

$$L = \begin{bmatrix} \lambda_1 & 0 \\ 0 & \lambda_2 \end{bmatrix},$$

and the interpolated 2-dimensional motion parameters that represent motion from a region in an interpolated frame to said region in the first frame are $\lambda_1^b$, $\lambda_2^b$, $\theta^b$, $\phi^b$, $b_1^b$ and $b_2^b$ and are obtained in (C) as:

$$\lambda_1^b = \frac{\lambda_1}{\lambda_1 + (1-\lambda_1)\Delta t}$$

$$\lambda_2^b = \frac{\lambda_2}{\lambda_2 + (1-\lambda_2)\Delta t}$$

$$\theta^b = \theta * \Delta t$$

$$\phi^b = \phi * \Delta t$$

$$b_1^b = b_1 * \Delta t$$

$$b_2^b = b_2 * \Delta t$$

where $\Delta t$ is the time interval from the first frame to the interpolated frame where the first and second frames are at times t and t+1 in arbitrary units and $0 < \Delta t < 1$.

4. A method according to claim 3, wherein in (D) the first set of six affine parameters that represent motion from said region in the interpolated frame to said region in the first frame are $a_{11}^b, a_{12}^b, a_{21}^b, a_{22}^b, b_1^b, b_2^b$ where:

$$A^b = \begin{bmatrix} a_{11}^b & a_{12}^b \\ a_{21}^b & a_{22}^b \end{bmatrix} \text{ and}$$

$$\overline{b}^b = \begin{bmatrix} b_1^b \\ b_2^b \end{bmatrix}$$

and $A^b$ is obtained using the formula:

$$A^b = R(\theta^b)R(-\phi^b)L^b R(\phi^b) \text{ where}$$

$$L^b = \begin{bmatrix} \lambda_1^b & 0 \\ 0 & \lambda_2^b \end{bmatrix},$$

and said second set of six affine parameters that represent motion from said region in the interpolated frame to said region in the second frame are $a_{11}^f, a_{12}^f, a_{21}^f, a_{22}^f, b_1^f, b_2^f$ where:

$$A^f = \begin{bmatrix} a_{11}^f & a_{12}^f \\ a_{21}^f & a_{22}^f \end{bmatrix} \text{ and}$$

$$\overline{b}^f = \begin{bmatrix} b_1^f \\ b_2^f \end{bmatrix}$$

which are obtained using the formulae:

$$A^f = A^{-1}A^b$$

$$\overline{b}^f = -A^{-1}(\overline{b} - \overline{b}^b)$$

where $A^{-1}$ is the inverse of the affine matrix A.

5. A method according to claim 1, wherein said region of the interpolated frame contains plural pixels, and in (E) the locating the position(s) and the obtaining of an interpolated intensity is carried out in respect of each of said plural pixels.

6. A method according to claim 1, wherein it is determined that the respective regions in the first frame, the second frame and the interpolated frame correspond if they are at the same location with respect to the coordinate origin of their respective frames and have the same spatial extent.

7. A method according to claim 1, wherein in (C):
two of the 2-dimensional motion parameters account for translation of a region from one frame to another and are interpolated linearly;
one of the 2-dimensional motion parameters accounts for rotation of a region from one frame to another and is interpolated linearly; and,
the three remaining 2-dimensional motion parameters account for scaling and shearing of a region from one frame to another, one of said three remaining 2-dimensional motion parameters being interpolated linearly and the other two of said three remaining 2-dimensional motion parameters being interpolated non-linearly.

8. A method of increasing the frame rate of an input video signal by interpolating video frames between original video frames of the input video signal and inserting interpolated video frames between original video frames of the input video signal to produce an output video signal having a higher frame rate than the input signal, the method comprising:
for each of plural regions in a first frame of an input video signal and plural corresponding regions of a second frame of the input video signal:
(A) estimating eight homography parameters of an homography model that represent relative motion between a region in a first frame of an input video signal and a corresponding region in a second frame of the input video signal;
(B) interpolating said eight homography parameters for a time instant between the first and second frames to obtain eight interpolated homography parameters that represent motion from a region in an interpolated frame to at least one of (i) said region in the first frame and (ii) said region in the second frame, wherein the interpolated frame is to be inserted between the first and second frames and wherein said region in the interpolated frame corresponds to said regions in the first and second frames; and,
(C) locating a position in (i) the first frame in the case that said interpolated homography parameters represent motion from the region in the interpolated frame to said region in the first frame, and/or (ii) the second frame in the case that said interpolated homography parameters represent motion from the region in the interpolated frame to said region in the second frame, said position corresponding to a pixel in said region of the interpolated frame and being located by using the respective eight interpolated homography parameters obtained in step (B), and obtaining an interpolated intensity of said pixel in said region of the interpolated frame as a function of the intensities at said position(s); and,
having by (C) interpolated plural regions of the interpolated frame such that the whole of the interpolated frame has been obtained, inserting said interpolated frame between said first and second frames.

9. A method according to claim 8, wherein:
(B) comprises interpolating said eight homography parameters for a time instant between the first and second frames to obtain a first set of interpolated homography parameters that represent motion from a region in an interpolated frame to said region in the first frame, and interpolating said eight homography parameters for said time instant between the first and second frames to obtain a second set of interpolated homography parameters that represent motion from a region in an interpolated frame to said region in the second frame; and,
(C) comprises obtaining the interpolated region of the interpolated frame by: locating the sub-pixel position in the first frame that corresponds to a pixel in said region of the interpolated frame by using said first set of respective homography parameters obtained in step (B), locating the sub-pixel position in the second frame that corresponds to a pixel in said region of the interpolated frame by using said second set of respective homography parameters obtained in step (B), and obtaining an interpolated intensity of said pixel in said region of the interpolated frame as a function of the intensities at said positions in the first and second frames.

10. A method according to claim 8, wherein said region of the interpolated frame contains plural pixels, and the locating the position(s) and the obtaining of an intensity is carried out in respect of each of said plural pixels.

11. A method according to claim 8, wherein it is determined that the respective regions in the first frame, the second frame and the interpolated frame correspond if they are at the same location with respect to the coordinate origin of their respective frames and have the same spatial extent.

12. A method according to claim 8, wherein:
(B) comprises interpolating said eight homography parameters for a time instant between the first and second frames to obtain eight interpolated homography parameters that represent motion from a region in an interpolated frame to said corresponding region in the first frame using the formula:

$$G_p^b = \Delta t(G_p - I) + I$$

where:
$G_p$ is the projective homography matrix that contains the eight homography parameters that represent motion from said region in the second frame of the input video signal to said corresponding region in the first frame of the input video signal,
$\Delta t$ is the time interval from the first frame to the interpolated frame where the first and second frames are at times t and t+1 in arbitrary units and $0<\Delta t<1$,
$G_p^b$ is the projective homography matrix that contains the eight interpolated homography parameters that represent motion from said region in the interpolated frame to said corresponding region in the first frame, and
I is the identity matrix; and,
(C) comprises obtaining the interpolated region of the interpolated frame by locating the sub-pixel position in the first frame that corresponds to a pixel in said region of the interpolated frame by using the interpolated homography parameters in $G_p^b$ and obtaining an interpolated intensity of said pixel in said region of the interpolated frame as a function of the intensity at said position.

13. A method according to claim 12, wherein the projective homography matrix $G_p^f$ that contains the eight interpolated homography parameters that represent motion from said region in the interpolated frame to said corresponding region in the second frame is obtained using the formula:

$$G_p^f = sG_p^{-1} G_p^b$$

where:
$G_p^{-1}$ is the inverse matrix of $G_p$, and
s is a scale factor; and,
(C) comprises obtaining the interpolated region of the interpolated frame by locating the sub-pixel position in the first frame that corresponds to a pixel in said region of the interpolated frame by using the interpolated homography parameters in $G_p^b$; locating the sub-pixel position in the second frame that corresponds to said pixel in said region of the interpolated frame by using the interpolated homography parameters in $G_p^f$; and obtaining an interpolated intensity of said pixel in said region of the interpolated frame as a function of the intensities at said respective positions in the first and second frames.

14. A method according to claim 8, wherein:
(B) comprises interpolating said eight homography parameters for a time instant between the first and second frames to obtain eight interpolated homography parameters that represent motion from a region in an interpolated frame to said corresponding region in the first frame by:
(B1) obtaining the parameters of the Euclidean homography matrix $H_e$ where:

$$H_e = (K^t)^{-1} G_p K^{t+1}$$

where:
$G_p$ is the projective homography matrix that contains said eight homography parameters that represent motion from said region in the second frame of the input video signal to said corresponding region in the first frame of the input video signal, $(K^t)^{-1}$ is the inverse of the camera calibration matrix at time t+1 corresponding to the second frame; and
$K^{t+1}$ is the camera calibration matrix at time t=1 corresponding to the second frame;
(B2) decomposing said Euclidean homography parameters into rotation, translation and structure parameters using the formula:

$$H_e = R - \bar{t}\bar{n}^T$$

where:
R is a rotation matrix,
$\bar{t}$ is a normalized translational vector from time t+1 to t, and
$\bar{n}$ is a surface normal;
(B3) selecting one of the solutions for R, $\bar{t}$ and $\bar{n}$ provided by the decomposition in B2;
(B4) obtaining a rotation angle θ of the rotation matrix R of the solution selected in B3;
(B5) calculating a camera zoom factor c between the first and second frames;
(B6) interpolating the rotation angle θ obtained in B4, the normalized translational vector $\bar{t}$ selected in B3 and the camera zoom factor c calculated in B5 as follows:

$$\theta^b = \theta * \Delta t$$

$$\bar{t}^b = \bar{t} * \Delta t$$

$$c^b = (c-1)\Delta t + 1$$

where:
$\Delta t$ is the time interval from the first frame to the interpolated frame where the first and second frames are at times t and t+1 in arbitrary units and $0<\Delta t<1$
and $\theta^b$, $\bar{t}^b$, and $c^b$ are the rotation angle, normalized translational vector $\bar{t}$ and camera zoom factor relating to motion from said region in said interpolated frame to said corresponding region in the first frame; and,
(B7) obtaining said eight interpolated homography parameters that represent motion from the region in the interpolated frame to the corresponding region in the first frame from $\theta^b$, $\bar{t}^b$ and $c^b$ thereby to obtain the projective homography matrix $G_p^b$ that contains said eight interpolated homography parameters; and,
(C) comprises obtaining the interpolated region of the interpolated frame by locating the sub-pixel position in the first frame that corresponds to a pixel in said region of the interpolated frame by using the interpolated homography parameters in $G_p^b$ and obtaining an interpolated intensity of said pixel in said region of the interpolated frame as a function of the intensities at said position.

15. A method according to claim 14, wherein the projective homography matrix $G_p^f$ that contains the eight interpolated homography parameters that represent motion from said region in the interpolated frame to said corresponding region in the second frame is obtained using the formula:

$$G_p^f = sG_p^{-1} G_p^b$$

where:
$G_p^{-1}$ is the inverse matrix of $G_p$, and
s is a scale factor; and,
(C) comprises obtaining the interpolated region of the interpolated frame by locating the sub-pixel position in the first frame that corresponds to a pixel in said region of the interpolated frame by using the interpolated homography parameters in $G_p^b$; locating the sub-pixel position in the second frame that corresponds to said pixel in said region of the interpolated frame by using the interpolated homography parameters in $G_p^f$; and obtaining an interpolated intensity of said pixel in said region of the interpolated frame as a function of the intensities at said respective positions in the first and second frames.

16. A method according to claim 14, wherein in B3, the one of the solutions for R, $\bar{t}$ and n provided by the decomposition in B2 is selected by minimising a cost function that relates to values of R, $\bar{t}$ and $\bar{n}$ between plural pairs of frames.

17. Apparatus constructed and arranged to carry out a method according to claim 1.

\* \* \* \* \*